US00RE43344E

(19) United States
(12) Reissued Patent
Cisar

(10) Patent Number: US RE43,344 E
(45) Date of Reissued Patent: *May 1, 2012

(54) PROGRAMMABLE MOBILE DEVICE WITH THUMB WHEEL

(75) Inventor: James M. Cisar, Wadsworth, OH (US)

(73) Assignee: Symbol Technologies, Inc., Holtsville, NY (US)

( * ) Notice: This patent is subject to a terminal disclaimer.

(21) Appl. No.: 10/968,820

(22) Filed: Oct. 19, 2004

Related U.S. Patent Documents

Reissue of:
(64) Patent No.: 5,931,873
Issued: Aug. 3, 1999
Appl. No.: 08/726,030
Filed: Oct. 4, 1996

U.S. Applications:
(63) Continuation of application No. 09/921,103, filed on Aug. 2, 2001, now Pat. No. Re. 39,683.

(51) Int. Cl.
*G05D 3/00* (2006.01)

(52) U.S. Cl. ..... 701/1; 701/29; 701/31; 702/68; 235/462.46

(58) Field of Classification Search ..... 701/1, 19, 701/20, 29, 31, 29.1, 31.9; 246/187 C, 167 R, 246/182 B, 169 R; 340/933, 539, 961; 702/76, 702/68; 324/76.15, 76.24; 235/462.46
See application file for complete search history.

(56) References Cited

U.S. PATENT DOCUMENTS 4,126,779 A 11/1978 Jowers et al.
4,359,222 A 11/1982 Smith, III et al.
4,437,739 A 3/1984 Haskin
4,627,277 A 12/1986 Baer
4,650,161 A 3/1987 Kaneko
4,685,065 A 8/1987 Braun et al.
4,887,968 A 12/1989 Wickstead et al.
4,993,004 A 2/1991 Loizeaux
5,374,015 A 12/1994 Bezos et al.
5,409,478 A 4/1995 Gerry et al.
5,411,185 A 5/1995 Drobish
5,433,350 A 7/1995 Graubart
5,473,344 A 12/1995 Bacon et al.
5,507,457 A 4/1996 Kull
5,539,193 A 7/1996 Gibbs et al.
5,539,194 A 7/1996 Miller et al.
(Continued)

OTHER PUBLICATIONS

U.S. Appl. Nos. 11/756,843; 09/921,103 same as reissue RE39683.*

(Continued)

*Primary Examiner* — Gertrude Arthur Jeangla

(57) ABSTRACT

A programmable mobile terminal which includes a thumb wheel for selecting among a plurality of functions executable by the mobile terminal. The programmable mobile terminal allows a user to employ the same hand that is holding the mobile terminal to scroll through and select a function among a plurality of functions via the thumb wheel. The wheel portion of thumb wheel is rotated either clockwise or counter clockwise by the user's thumb or other finger to scroll a screen cursor through the functions and once the screen cursor of the mobile terminal is positioned at a desired function, the user can depress the wheel portion in a transaxial direction with the same thumb or finger to select the desired function. Also, the programmable mobile terminal allows a user to scan bar code information and use the thumb wheel for selecting among a plurality of functions relating to the scanned bar code information.

26 Claims, 6 Drawing Sheets

U.S. PATENT DOCUMENTS

| | | | | |
|---|---|---|---|---|
| 5,540,125 | A | 7/1996 | Haskell | |
| 5,627,531 | A | 5/1997 | Posso et al. | |
| 5,648,897 | A | 7/1997 | Johnson et al. | |
| 5,681,015 | A | 10/1997 | Kull | |
| 5,684,861 | A | 11/1997 | Lewis et al. | |
| 5,821,513 | A | 10/1998 | O'Hagan et al. | |
| 5,887,269 | A | 3/1999 | Brunts et al. | |
| 5,931,873 | A | 8/1999 | Cisar | |
| 5,999,827 | A | 12/1999 | Sudo et al. | |
| 6,011,542 | A | 1/2000 | Durrani et al. | |
| 6,034,688 | A | 3/2000 | Greenwood et al. | |
| 6,046,684 | A | 4/2000 | Hamersley et al. | |
| 6,227,625 | B1 | 5/2001 | Gaughan | |
| 6,366,771 | B1 | 4/2002 | Angle et al. | |
| RE39,683 | E * | 6/2007 | Cisar | 701/1 |

OTHER PUBLICATIONS

Non Final Office Action mailed on Sep. 16, 2002 in related U.S. Appl. No. 09/921,103, filed Aug. 2, 2001.

Final Office Action mailed on Feb. 11, 2003 in related U.S. Appl. No. 09/921,103, filed Aug. 2, 2001.

Ex Parte Quayle Action mailed on Aug. 12, 2003 in related U.S. Appl. No. 09/921,103, filed Aug. 2, 2001.

Ex Parte Quayle Action mailed on Jan. 22, 2004 in related U.S. Appl. No. 09/921,103, filed on Aug. 2, 2001.

Ex Parte Quayle Action mailed on Mar. 10, 2006 in related U.S. Appl. No. 09/921,103, filed Aug. 2, 2001.

Notice of Allowance mailed on Jan. 17, 2007 in related U.S. Appl. No. 09/921,103, filed Aug. 2, 2001.

Non Final Office Action mailed on Feb. 23, 1998 in related U.S. Appl. No. 08/726,030, filed Oct. 4, 1996.

Final Office Action mailed on Jul. 21, 1998 in related U.S. Appl. No. 08/726,030, filed Oct. 4, 1996.

Notice of Allowance mailed on Jan. 5, 1999 in related U.S. Appl. No. 08/726,030, filed Oct. 4, 1996.

Non Final Office Action mailed on Nov. 20, 2007 in related U.S. Appl. No. 11/756,843, filed Jun. 1, 2007.

Notice of Allowance mailed Jun. 17, 2008 in related U.S. Appl. No. 11/756,843, filed Jun. 1, 2007.

* cited by examiner

PROGRAMMABLE MOBILE DEVICE WITH THUMB WHEEL

Matter enclosed in heavy brackets [ ] appears in the original patent but forms no part of this reissue specification; matter printed in italics indicates the additions made by reissue.

*CROSS-REFERENCE TO RELATED APPLICATIONS*

*This application is a continuation reissue application of U.S. application Ser. No. 09/921,103 filed on Aug. 2, 2001, which issued as U.S. Pat. No. Re. 39,683 on Jun. 5, 2007, entitled PROGRAMMABLE MOBILE DEVICE WITH THUMB WHEEL, which is a reissue application of U.S. Pat. No. 5,931,873, the entirety of which is incorporated herein by reference.*

TECHNICAL FIELD

The present invention relates generally to programmable mobile terminals. More particularly, the present invention relates to a programmable mobile terminal which includes a thumb wheel for selecting among a plurality of functions executable by the mobile terminal.

BACKGROUND OF THE INVENTION

In recent years, the use of wireless communication systems having mobile transceivers which communicate with a hard-wired network, such as a local area network (LAN) or a wide area network (WAN), has become widespread. The mobile transceivers, commonly referred to as mobile terminals, may take one of several different forms. For instance, in retail stores hand-held scanning units may be used to allow for scanning inventory bar codes. In a warehouse, portable units mounted to a vehicle may be used to gather information from the warehouse floor. In a medical environment, the mobile terminal may take the form of a pen based workslate which allows medical personnel to work with full page screens.

In a typical wireless communication system, each mobile terminal communicates with a networked system via a radio or optical link in order to allow for a real time exchange of information. The mobile terminals communicate through one of several base stations interconnected to the network. The base stations allow for a wireless data communication path to be formed. Consequently, such mobile terminals significantly facilitate worker efficiency since data can be gathered, transmitted and even processed at a remote site in real time.

However, despite the aforementioned advantages associated with mobile terminals, there is a strong need for a more ergonomic mobile terminal. For example, mobile terminals are typically held in one hand and a user has to use the other hand to scroll through functions and select a function. Thus, both hands are usually occupied at one time or another when using a mobile terminal. As a result, a user is physically limited by such conventional mobile terminals since the user would have to cease interaction with the mobile terminal to free at least one hand to accomplish another task such as taking a patients temperature, writing on a piece of paper, using the telephone, etc.

In view of the aforementioned drawbacks associated with conventional mobile terminals, there is a strong need in the art for a mobile terminal which eliminates or at least reduces the need for a user to use both hands while employing a mobile terminal.

SUMMARY OF THE INVENTION

The present invention relates to programmable mobile terminal in which a thumb wheel is employed to select among a plurality of functions executable by the mobile terminal. The programmable mobile terminal, as a result of the thumb wheel, affords a user to employ the same hand that is holding the mobile terminal to scroll through and select a function among a plurality of functions. The wheel portion of thumb wheel is rotated either clockwise or counter clockwise by the user's thumb or other finger to scroll a screen cursor through the functions and once the screen cursor of the mobile terminal is positioned at a desired function, the user can depress the wheel portion in a transaxial direction with the same thumb or finger to select the desired function. As a result, the thumb wheel allows a user to hold and also interact with the mobile terminal with only one hand thus freeing his or her other hand for other purposes.

In accordance with one particular aspect of the invention, a mobile device for use in a cellular communication system is provided, the mobile device including: a housing; a user programmable processor within the housing; thumb wheel extending from the housing, the thumb wheel including: a wheel portion rotatable about an axis; and a control circuit operatively coupled to the thumb wheel, wherein the control circuit provides at least one signal to the processor in response to movement of the wheel portion.

According to another aspect of the invention, a method of selecting among a plurality of functions executable by a user programmable mobile terminal is provided, including the steps of: using an interrupt generator to monitor a thumb wheel for movement of a wheel portion of the thumb wheel; using the interrupt generator to generate an interrupt request upon movement of the wheel portion, and sending the interrupt request to an interrupt handler, using the interrupt handler to inform a processor that an interrupt relating to movement of the wheel portion has occurred; using the processor to determine what type of wheel portion movement has occurred, wherein the processor relates a particular wheel portion movement to at least one of the plurality of functions executable by the programmable mobile terminal; and using the processor to perform a routine corresponding to the at least one of the plurality of functions executable by the programmable mobile terminal.

According to still another aspect of the invention, a mobile device is provided, comprising: a housing; a user programmable processor within the housing, wherein the processor can receive, store and execute programs input thereto by the user; a scanner, and a thumb wheel received within the housing, the thumb wheel including a wheel portion, an encoding device and a control circuit, wherein: the wheel portion is rotatable about an axis and transaxially moveable; the encoding device produces at least one signal indicative of movement of the wheel portion; and the control circuit is coupled to the encoding device for receiving the at least one signal from the encoding device and outputting a signal to the processor in response thereto, wherein the processor performs a particular routine among a plurality of routines executable by the processor in response to the signal output by the control device.

According to yet another aspect of the invention, a mobile device for use in a cellular communication system is provided, the mobile device including: a portable housing; a user programmable processor within the housing; a bar code reader coupled to the processor for reading bar code information; a thumb wheel extending from the housing, the thumb wheel including: a wheel portion rotatable around an axis; and a control circuit operatively coupled to the thumb wheel, wherein the control circuit provides at least one signal to the processor in response to movement of the wheel portion.

To the accomplishment of the foregoing and related ends, the invention, then comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

DESCRIPTION OF THE PREFERRED EMBODIMENT

Figure 1:
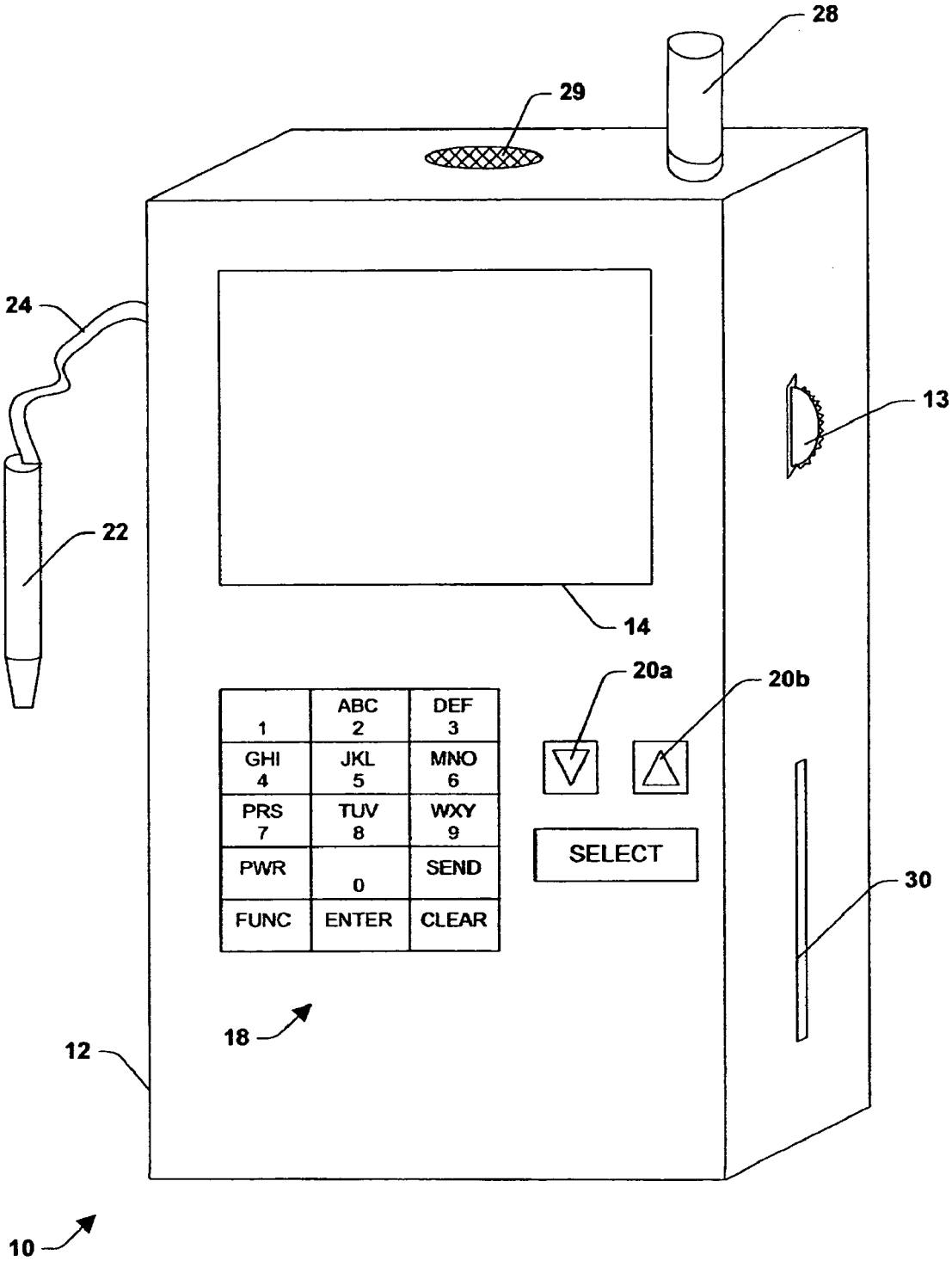
FIG. 1 is a perspective view of a mobile terminal having a thumb wheel in accordance with the present invention.

The present invention will now be described with reference to the drawings wherein like reference numerals are used to refer to like elements throughout.

As is mentioned above, the present invention relates to a programmable mobile terminal (e.g., a portable teletransaction computing device (PTC)) in which a thumb wheel is employed to select among a plurality of functions executable by the device (PTC). In the exemplary embodiments described hereinafter, each PTC is a hand held inventory control device used to communicate data such as inventory or the like within a cellular, narrow band or other radio communication system including multiple mobile terminals and base stations. However, it is recognized that the present invention contemplates other types of programmable mobile terminals or devices and is not intended to be limited necessarily to hand held inventory control devices or devices which must wirelessly communicate information.

Referring initially to FIG. 1, a mobile terminal 10 is shown in accordance with the present invention. The terms "mobile terminal" and "PTC" are used interchangeably throughout the specification. The mobile terminal 10 includes a portable housing 12 which is preferably made of metal, high strength plastic, or the like. The mobile terminal 10 includes a thumb wheel 13 partially exposed through the housing 12. In addition, the mobile terminal 10 includes a display 14 such as a liquid crystal display or the like. As is conventional, the display 14 functions to display data or other information relating to ordinary operation of the mobile terminal 10 in a cellular communication system. For example, the display 14 may display inventory information, pricing detail, etc. which is to be transmitted to or is received from a system backbone. Additionally, the display 14 may display a variety of functions that are executable by the mobile terminal 10.

The mobile terminal 10 further includes an operator input device 18 in the form of a key pad which enables a user to enter data, information, function commands, etc. as is conventional. For example, the user may input information relating to inventory via the keypad 18 for subsequent transmission to a base station (not shown). In addition, the keypad 18 includes up and down cursor keys 20a and 20b, respectively, for controlling a cursor which may be shown on the display 14. By selectively pressing the up and down cursor keys 20a and 20b, the user is able to move the cursor about the display 14. Furthermore, the key pad 18 includes a select key 20c for selecting an item or function designated by the cursor.

The thumb wheel 13 can accomplish many of the same tasks as the combination of the cursor keys 20a and 20b and the select key 20c. For instance, the wheel portion 13a (FIG. 3) of the thumb wheel 13 can be rotated manually by the user either clockwise or counter clockwise to move the cursor up or down like the cursor keys 20a and 20b. The thumb wheel 13, like the select key 20c, also can be used to select an item or function designated by the cursor by simply pressing the wheel portion 13a transaxially in an inward direction toward the housing 12 of the mobile terminal 10. As is discussed more fully below, the thumb wheel 13 exhibits a push button action when pressed in a direction normal to the axis of rotation of the thumb wheel 13.

As a result, a user by employing the thumb wheel 13 can accomplish many tasks involving the mobile terminal 10 with only one hand (the hand holding the mobile terminal 10). For example, a nurse holding a mobile terminal 10 (adapted and user programmed for operation in a medical environment) could possibly manipulate data and information or select among a variety of functions available by the mobile terminal 10 using the one hand holding the mobile terminal 10. With the mobile terminal 10 seated in the palm of the nurse's hand, the nurse may use her thumb to rotate and depress the thumb wheel 13 in order to pull up a patient's chart. Thus, the nurse's other hand can be free to perform other tasks such as taking a patient's temperature, using a telephone, etc.

Referring again to FIG. 1, the mobile terminal 10 also includes a bar code reader 22 in the form of a wand or the like which allows information to be input to the mobile terminal 10 via bar code symbols. The bar code reader 22 is coupled to the housing 12 by a cable 24 which provides the appropriate electrical connections between the bar code reader 22 and the circuitry contained in the housing 12.

Extending from the housing 12 is an antenna 28 for transmitting and receiving radio signals within a cellular communication system. In the exemplary embodiment, the antenna 28 is an omnidirectional antenna but other types of antennas are equally possible. A speaker 29 is integral to the housing 12 and provides an audial output for the user. Additionally, the mobile terminal 10 includes a PCMCIA card slot for receiving a PCMCIA card. As mentioned above, the mobile terminal 10 is user programmable and thus a user can input commercial or user created software to tailor the mobile terminal 10 to execute desired functions. However, it is understood that this invention is not limited to inputting functions, instructions or data via PCMCIA card, and that any suitable means for a user to input functions, instructions or data to the mobile terminal 10 falls within the scope of the this invention.

Figure 2:
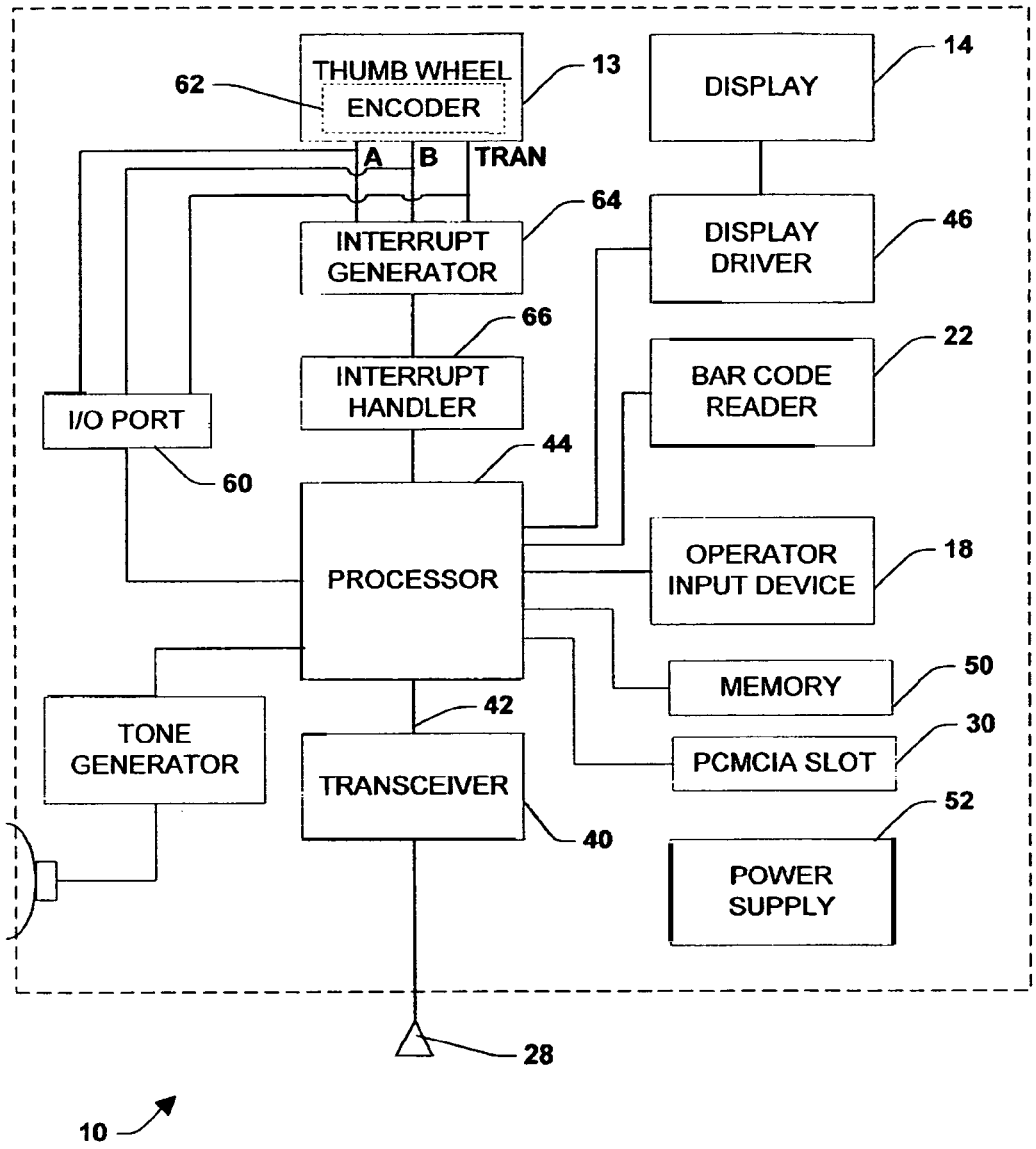
FIG. 2 is a block diagram of a mobile terminal in accordance with the present invention.

Referring now to FIG. 2, a block diagram of the electronic circuitry within the mobile terminal 10 is shown. As noted above, the mobile terminal 10 includes an antenna 23 for receiving and transmitting signals via a transceiver 40 to which it is connected. The transceiver 40 is coupled via a control/data bus 42 to a processor 44 included in the mobile terminal 10. The processor 44 is responsible for controlling the general operation of the mobile terminal 10 with respect to processing and storing information received and transmitted by the transceiver 40. The processor 44 is programmed to control and to operate the various components within the mobile terminal 10 in order to carry out various functions described herein. The operator input device 18 is coupled to the processor 44 which allows an operator to input data to be communicated to a system backbone (not shown) or local computer (not shown) such as inventory data, ordering information, and the like. The input device 18 can include such items as the aforementioned keypad, touch sensitive display, etc. The mobile terminal 10 also includes the bar code reader 22 coupled to the processor 44 for providing another form of data input.

The display 14 is connected to and controlled by the processor 44 via a display driver circuit 46. A memory 50 is included in the mobile terminal 10 for storing program code executed by the processor 44 for carrying out operating functions of the mobile terminal 10 as described herein. The memory 50 may also serve as a storage medium for temporarily storing information received from or intended to be transmitted to a base station (not shown) or a local computer (not shown).

A power supply 52 is also included in the mobile terminal 10 for providing power to the various components of the mobile terminal 10 as is conventional. The power supply 52 may be in the form of a battery and/or connectable to an external power source such as a wall outlet.

With the exception of the antenna 28, the components making up the mobile terminal 10 are preferably housed in a palm-sized housing 12 represented in phantom. This makes the mobile terminal 10 highly portable and easy to carry from one cell to another within a cellular system.

The thumb wheel includes an encoder 62 for discerning displacement of the wheel portion 13a of the thumb wheel 13. The thumb wheel 13 allows an operator to perform many of the same functions as the operator input device 18 such as scrolling up and down through items or functions displayed on the screen 14 and/or selecting a particular item or function displayed on the screen 14. The thumb wheel 13 is coupled to the processor 44 by both an I/O port 60 and via an interrupt generator 64 which is tied to an interrupt handler 66 which is coupled to the processor 44.

The thumb wheel 13 has outputs A, B and SW, respectively corresponding to the "A" signal, "B" signal and the transaxial switch "THAN" signal 25 are discussed more fully below. These outputs are coupled to both the interrupt generator 64 and an input/output port 60. The interrupt generator 64 serves to generate a system interrupt signal (IRQ) in response to rotational or transaxial movement of the wheel portion 13a based on a change in the A, B or transaxial switch signals. The interrupt handler 66 processes interrupts generated by the interrupt generator 64, and informs the processor 44 that an interrupt has occurred. Additionally, as is conventional, the interrupt handler 66 may receive interrupt signals from other devices within the mobile terminal 10 such as the display driver 46, bar code reader 22, operator input device 18, etc. However, for sake of brevity, further elaboration on this aspect of the interrupt handler 66 is not presented.

The I/O port 60 serves to allow the processor to determine in what way the wheel portion 13a has moved (e.g., clockwise, counter clockwise and/or transaxially) upon receiving notice from the interrupt handler 66 that a system interrupt has been generated by the interrupt generator 64 in response to movement of the wheel portion 13a. The processor 44 determines how the wheel portion 13a has moved by evaluating the phase difference between signals "A" and "B" with respect to rotational movement. The processor 44 determines if the wheel portion 13a has moved transaxially by determining if SW is closed. The process of determining movement of the wheel portion 13a is explained in greater detail below.

Figure 3:
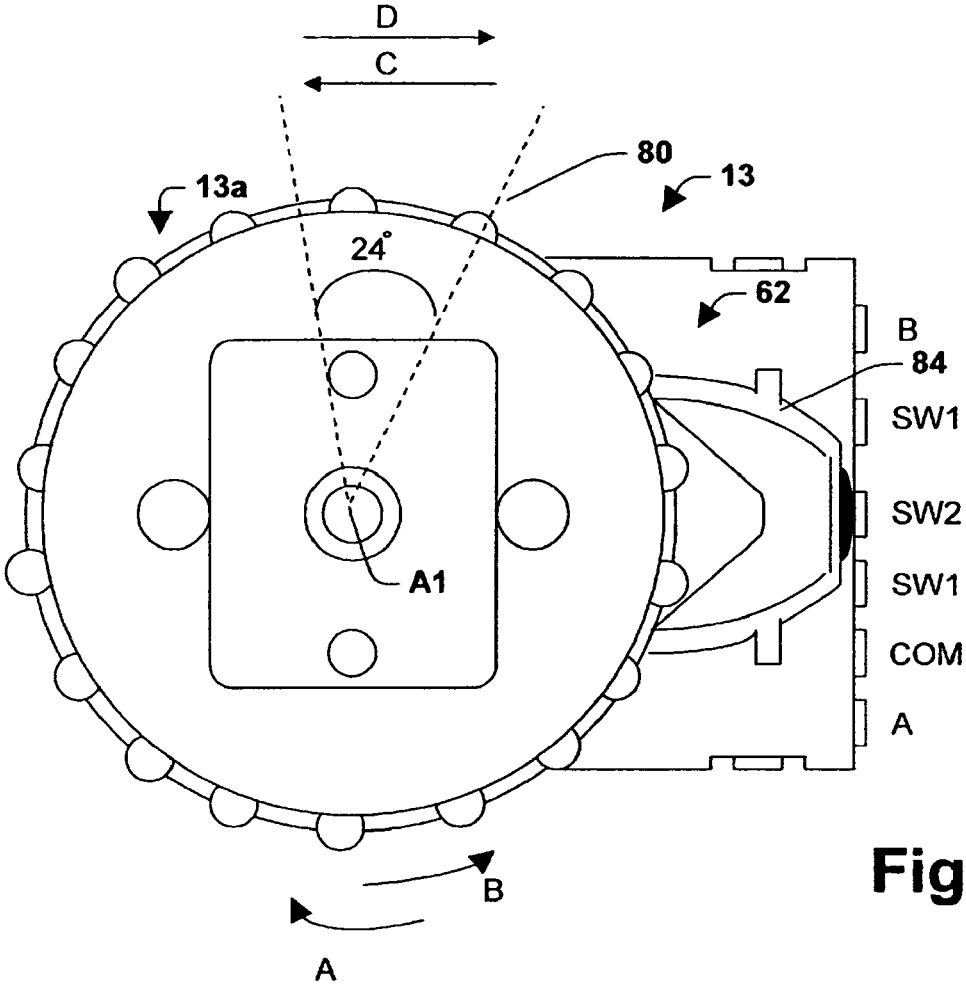
FIG. 3 is a front schematic view of the thumb wheel including an encoding device according to the present invention.

Referring now to FIG. 3, the thumb wheel 13 is illustrated in greater detail. The thumb wheel 13 in the exemplary embodiment is an ED Jog Encoder Part Number EVQWK6Z01 sold by Panasonic Industrial Company, Standard Components Division, 1707 North Randall Road, Elgin, Ill. 60123-7847. However, it is understood that any suitable thumb wheel can be employed for the purposes of this invention. For example, it will be appreciated that a thumb wheel employing an optical encoder would fall within the scope of the present invention.

The thumb wheel 13 has 15 detents (not shown) circumferentially spaced along the perimeter of the wheel portion 13a. The detents are spaced equidistance apart to create respective detent angles of 24°. The wheel portion 13a is rotatable about its central axis A1 in either a clockwise or counter clockwise direction as shown respectively by arrows "A" and "B". The wheel portion 13a can be rotated indefinitely in either the "A" or "B" direction. That is, the wheel portion 13a can be continuously turned in one direction. This feature can be utilized by the processor 44 to move the screen cursor down the display, for example, when the screen cursor reaches the bottom of the screen, it may appear at the top of the screen upon further rotation of the wheel portion 13a in the same direction.

Figure 4:
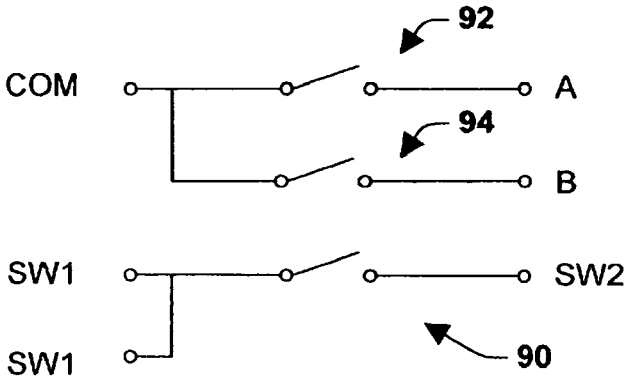
FIG. 4 is an equivalent circuit representing switches of the thumb wheel according to the present invention.

The wheel portion 13a is also transaxially moveable in the directions "C" and "D". For example, the wheel portion 13a is moved transaxially by a user in the "C" direction to select a function designated on the screen 14 by the cursor. A bulbous spring button 84 is coupled to the wheel portion 13a of the thumb wheel 13 and is biased to return via direction "D" the wheel portion 13a of the thumb wheel 13 to a non-select position. Thus, once a user selects an item or function by depressing the wheel portion 13a, the spring button 82 returns the wheel portion 13a back to a select position. The spring button 82 distorts upon transaxial force exerted on the thumb wheel 13. Accordingly, when a user exerts transaxial force in generally the direction "C", the spring button 84 is distorted. The spring button is always in contact with contact SW2 of the transaxial switch 90 (FIG. 4). The transaxial switch 90 corresponds to transaxial movement of the wheel portion 13a. When the spring button 84 is distorted by transaxial pressure it comes into contact with either or both SW1 contacts of the transaxial switch 90, and thus closes the transaxial switch 90. There are two SW1 contacts (located on either side of SW2) in the transaxial switch 90 for sake of redundancy.

The processor 44 can thus determine whether the wheel portion 13a has been moved transaxially by determining whether the transaxial switch 90 is open or closed. If the switch 90 is "open", the wheel portion 13a has not been moved transaxially. If the switch 90 is "closed", the wheel portion 13a has been moved transaxially.

Figure 5:
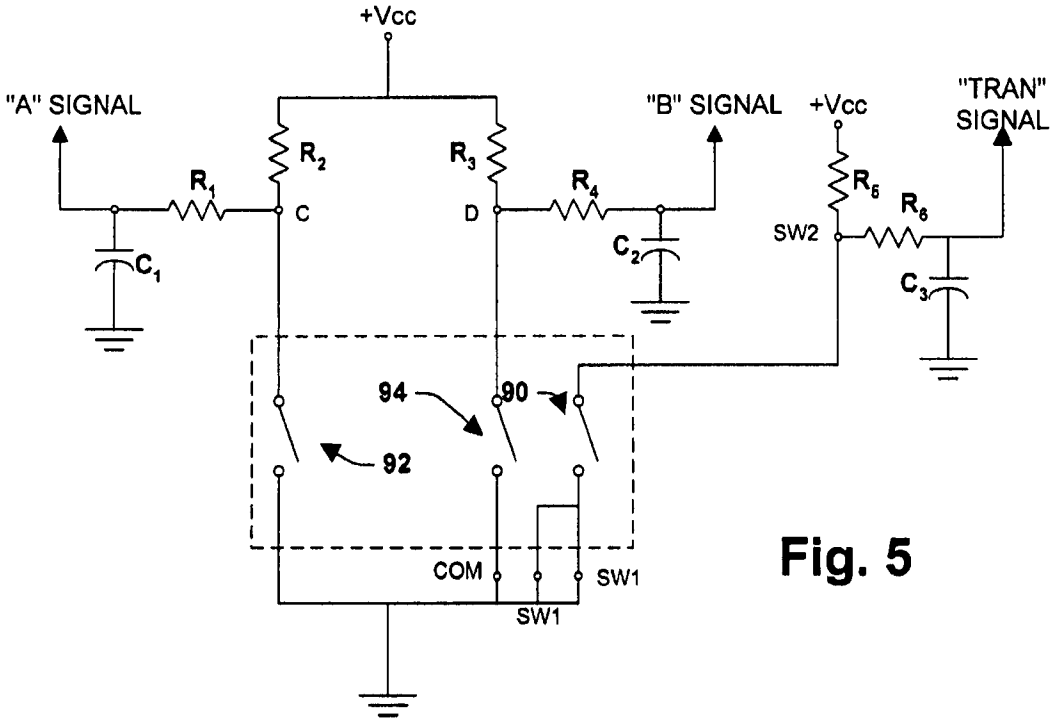
FIG. 5 is a circuit diagram of the thumb wheel and associated circuitry according to the present invention.

FIG. 4 also illustrates switch$_A$ 92 and switch$_B$ 94, which correspond to clockwise and counter clockwise rotation of the wheel portion 13a, respectively. The direction of rotation of the wheel portion 13a is determined by comparing the phase difference between the "A" signal and "B" signal output from the encoder circuit 100 (FIG. 5). The measuring circuit 100 works in the following manner. Either switch$_A$ 92 or switch$_B$ 94 closes for every 6° of movement of the wheel portion 13a. The 6° results from the fact that there are 15 detents, providing 15 detent angles which each correspond to 24° of movement of the wheel portion 13a. Since 24° of movement of the wheel portion 13a corresonds to one period of either the "A" signal or "B" signal, 6° of movement of the wheel portion 13a corresponds to one quadrant of the "A" signal or "B" signal.

Referring now to FIG. 5, the encoding circuit 100 is shown to include a voltage source $V_{cc}$ which is tied to a first end of resistors $R_2$, $R_3$ and $R_5$. A first end of Switch$_A$ 92 is connected to a node "C" between resistors $R_1$ and $R_2$. An other end of switch$_A$ 92 is tied to a common ground COM. An other end of $R_1$ is connected to a first end of capacitor $C_1$. An other end of $C_1$ is connected to COM. The "A" signal is output from a node connecting $R_1$ and $C_1$. Similarly a first end of switch$_B$ 94 is connected to a node "D" between resistors $R_3$ and $R_4$. An other end of switch$_b$ 94 is tied to a common ground COM. An other end of $R_4$ is connected to a first end of capacitor $C_2$. An other end of $C_2$ is connected to COM. The "B" signal is output from the node connecting $R_4$ and $C_2$. Likewise, a first end of the transaxial switch 90 is connected to the node between resistors $R_5$ and $R_6$. An other end of the transaxial switch 90 is tied to dual contacts SW1 which are tied to COM. An other end of $R_6$ is connected to a first end of capacitor $C_3$. The other end of $C_3$ is connected to COM. The transaxial signal "TRAN" is output from a node connecting $R_6$ and $C_3$. The values for the various resistors and capacitors of the encoder circuit 100 can be varied according to the desired operational parameters of the thumb wheel 13.

The encoder circuit 100 works in the following manner. If switch$_A$ 92 is open, the "A" signal is held high exhibiting a voltage relative to the voltage source $V_{cc}$. If switch$_A$ 92 is closed, the "A" signal is pulled low as a result of the short created by closing switch$_A$ 92. In a similar manner, if switch$_B$ 94 is open, the "B" signal is held high exhibiting a voltage relative to the voltage source $V_{cc}$. If switch$_B$ 94 is closed, the "B" signal is pulled low as a result of the short created by closing switch$_B$ 94. If switch 90 is open, the "TRAN" signal is held high at Vcc. On the other hand, if the thumb wheel 13 is depressed transaxially causing the switch 90 to close, the "TRAN" signal is pulled low.

Figure 6:
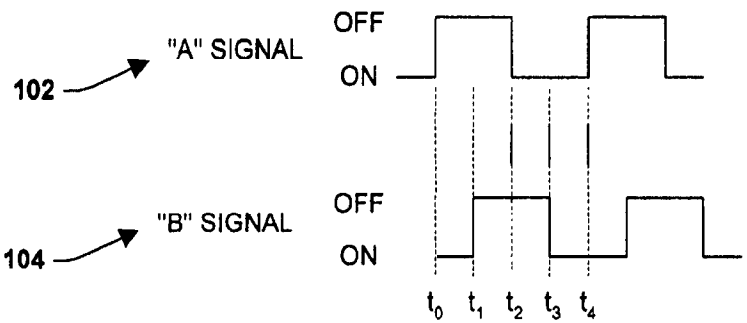
FIG. 6 is a timing diagram illustrating the phase difference between the output signals "A" and "B" of the thumb wheel when rotated in a clockwise or counter clockwise direction, respectively, according to the present invention.

FIG. 6 illustrates a timing diagram of the the "A" signal 102 and the "B" signal 104 where the wheel portion 13a is rotated in the clockwise direction. Initially, at time $t_o$ switch$_A$ 92 is open (i.e., OFF) and thus the "A" signal is high, and switch$_B$ 94 is closed (i.e., ON) and "B" signal is low. After 6° of rotation of the wheel portion 13a in the clockwise direction, at time $t_1$, switch$_A$ 92 is still closed and thus the "A" signal is still high. Also, at time $t_1$, switch$_B$ 94 opens thus sending the "B" signal high. After another 6° degrees of rotation in the clockwise direction, at time $t_2$, switch$_A$ 92 closes. At time $t_2$, switch B remains open and thus the "B" signal remains high. After another 6° degrees of rotation of the wheel portion 13a, at time $t_3$, switch$_A$ 92 remains closed and accordingly the "A" signal remains low. At time $t_3$, switch$_B$ closes and sends the "B" signal low. After another 6° of rotation in the clockwise direction, at time $t_4$, the end of the period for both the "A" and "B" signals are reached. At time $t_4$, switch, opens and sends the "A" signal high, and switch$_B$ remains closed with the "B" signal still low. The processor 44, by comparing the phase difference between the "A" and "B" signals, can determine that the "A" signal leads the "B" signal which corresponds to clockwise movement of the wheel portion 13a.

Correspondingly, if the wheel portion 13a was moving in the counter clockwise direction, the processor 44 would determine that the "B" signals leads the "A" signal by the above process and thus ascertain that the wheel portion 13a of the thumb wheel 13 is being rotated counter clockwise.

Figure 7:
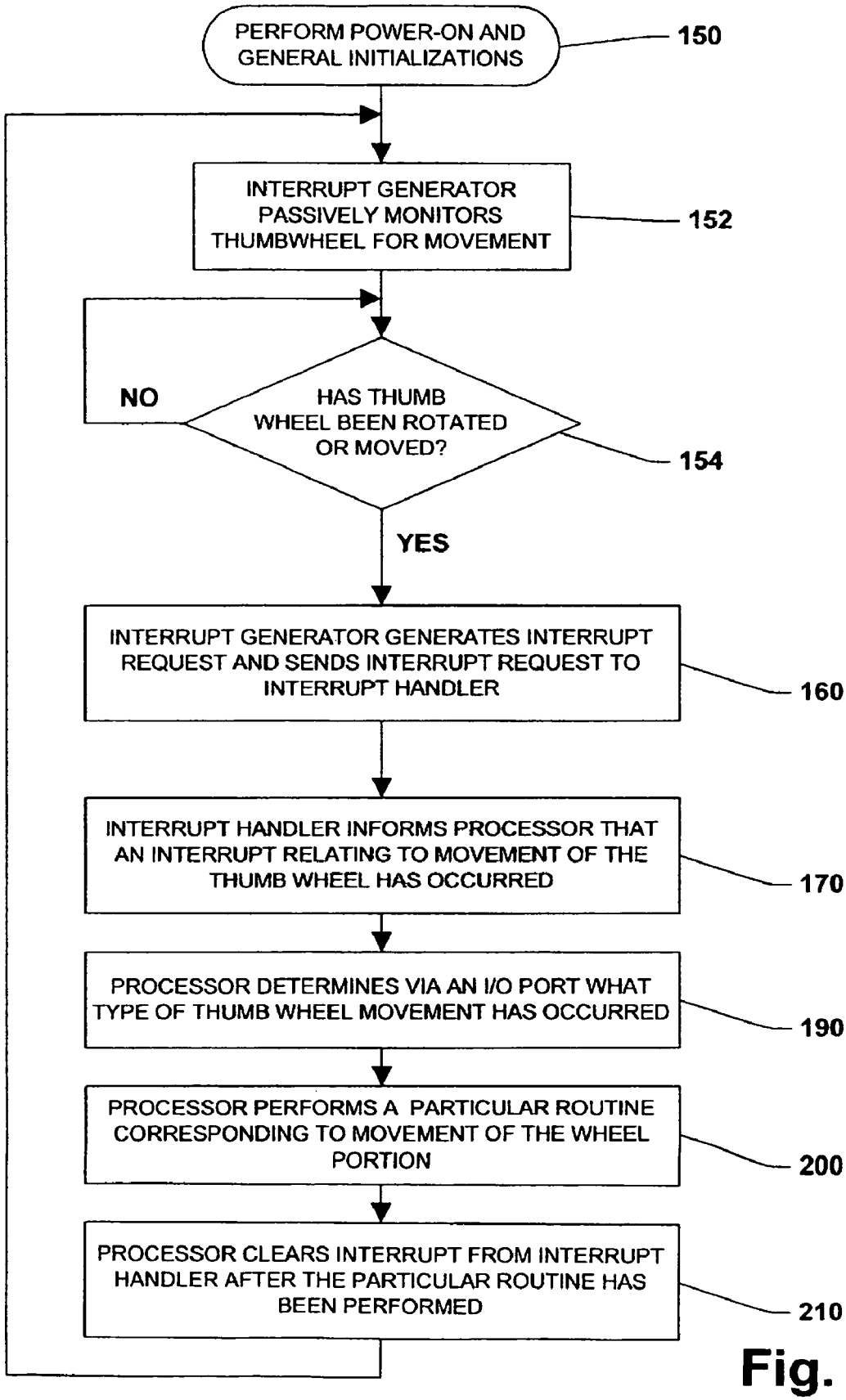
FIG. 7 is a system flowchart suitable for programming the mobile terminal to determine movement of the thumb wheel, and to perform a particular routine corresponding to the movement of the thumb wheel in accordance with the present invention.

Turning now to FIG. 7, the details of the process carried out by the processor 44 in which the system of the present invention determines that the wheel portion 13a has been moved and where the processor 44 performs a routine corresponding to the movement is described.

Beginning in step 150, the processor 44 starts power-on and general initializations as part of the overall initializations of the processor 44. Such initializations are conventionally known and are not further discussed for sake of brevity. In steps 152 and 154, the interrupt generator 64 passively monitors the mobile terminal 10 for any thumb wheel 13 movement by sensing a change in the state of the A, B and/or TRAN signals. If the wheel portion 13a has been rotated or transaxially moved, the process proceeds to step 160. In step 160, the interrupt generator 64 generates an interrupt request signal which is provided to the interrupt handler 66. If the wheel portion 13a has not been rotated or transaxially moved, the process continues to loop through step 154. In step 170, in response to movement of the wheel portion 13a, the interrupt generator 64 generates an interrupt request and sends an interrupt request to an interrupt handler 66. Following step 160, the process then advances to step 170 where the interrupt handler 66 informs the processor 44 that an interrupt relating to movement of the thumb wheel 13 has occurred.

It is to be understood that the interrupt handler 66 may also be used to handle interrupts generated by tie other devices of the mobile terminal 10 such as the display driver 46, the bar code reader 22, the operator input device 18, etc. However, such handling of devices by the interrupt handler 66 is conventional and therefore further discussion in relation thereto is not necessary for an understanding of the present invention.

After the processor 44 has teen informed that an interrupt relating to movement of the thumb wheel 13 has occurred, the process progresses to step 190 where the processor 44 determines via the I/O port 60 by the process described above what type movement (i.e., clockwise rotation, counterclockwise rotation, and/or transaxial movement) of the thumb wheel has occurred. In step 200, the processor 44 is programmed to perform a particular routine (described in greater detail below) corresponding to the particular movement of the thumb wheel 13. Next, after the processor 44 has performed the particular routine, the processor in step 210 clears the interrupt (corresponding to the routine just performed) stored in the interrupt handler. Then, the processor returns to step 152 to repeat the process.

Figure 8A:
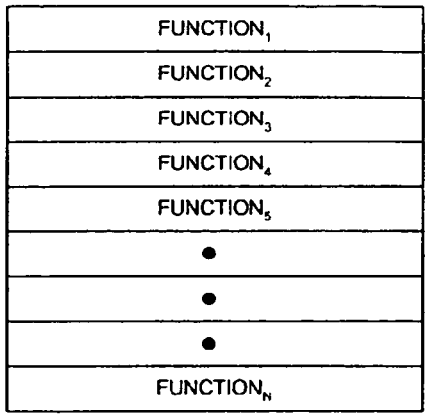
FIGS. 8A-8E represent various screen displays of functions executable by the mobile terminal and which can be selected by a user via the thumb wheel in accordance with the present invention.

FIGS. 8A-8E represent various screen displays of functions, executable by the mobile terminal, which can be selected by a user via the thumb wheel 13 in accordance with the exemplary emobodiment of the present invention. FIG. 8A illustrates the display screen 14 of the mobile terminal 10. The display screen 14 displays N functions (wherein N is the number of functions) that are executable by the mobile terminal 10. It is understood that the display screen 14 may also display N items (wherein N is the number of items). However, for ease of understanding, the following discussion will be presented in connection with functions executable by the mobile terminal 10.

A user holding the mobile terminal can scroll among the functions ($FUNCTION_1$ TO $FUNCTION_N$) by using either the scroll keys 20a and 20b or using the thumb wheel 13. For instance, in the present embodiment, $FUNCTION_1$ represents a scan operation. In other words, by depressing the thumb wheel 13 in a transaxial direction while a cursor is located at $FUNCTION_1$ the mobile device 10 will activate circuitry associated with the bar code scanner 22 in order that a bar coded label can be read. By rotating the wheel portion 13a of the thumb wheel 13 clockwise, the processor 44 is programmed to cause the screen cursor to scroll downward among other functions in response to the output signals from the thumb wheel 13. By rotating the wheel portion 13a of the thumb wheel 13 counter clockwise, the processor 44 will cause the screen cursor to scroll upward among the functions in response to the output signals from the thumb wheel 13. If the cursor, for example, is at FUNCTION, the user by rotating the wheel portion 13a of the thumb wheel 13 clockwise a predefined number of detents (or clicks) will move the cursor down to $FUNCTION_2$. If the user instead rotates the wheel portion 13a counter clockwise predefined number of detents, the cursor will move from $FUNCTION_1$ (at the top of the screen) to $FUNCTION_N$ (at the bottom of the screen). Likewise, if the cursor were at $FUNCTION_N$ (at the bottom of the screen) and the wheel portion 13a was rotated in the clockwise direction, the cursor would rollover to $FUNCTION_1$ (at the top of the screen) or perhaps remain at $FUNCTION_N$.

Figure 8B:
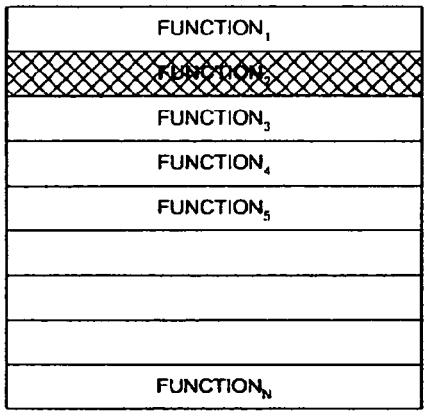
Figure 8C:
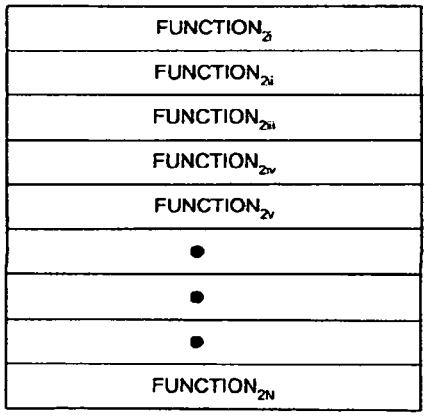

Turning now to FIG. 8B, the screen display 14 is shown with $FUNCTION_2$ selected by the cursor. By the user depressing the wheel portion 13a of the thumb wheel 13 transaxially toward the mobile terminal 10, the processor 44 detects the change in the TRAN signal from the thumb wheel 13 so as to determine that $FUNCTION_2$ is selected by the user. In response, the processor 44 is programmed to cause the screen illustrated in FIG. 8C to be displayed. This screen displays functions $FUNCTION_{2i}$ through $FUNCTION_{2N}$ (wherein N is the number of functions). These functions are sub-functions of $FUNCTION_2$ shown on the previous screen in FIG. 8B. In the manner described above, the user can scroll through these functions by rotating the wheel portion 13a clockwise or counter clockwise. Once the user has positioned the cursor to a desired sub-function, he or she can then select that sub-function by depressing the thumb wheel 13 in the manner described above.

To exit from the sub-menu, one of the available sub-function selections may be a return to main menu function. Additionally, however, the present embodiment may also provide an additional double "click" function to allow for more efficient user operations. The double click feature will take on different roles depending on what screen the user is on currently. For instance, in the present embodiment a double click (or in other words the depression of the thumb wheel 13 transaxially two times in a row in a relatively short period of time (i.e. less then one second)) which occurs while a user is in a sub-menu will automatically take the user back to the prior menu screen. If, however, the user is already on the first screen, a double click will take the user to a predefined function which is used repetitively. In this particular embodiment, the repetitive function is the scan function, and thus a double click while on the main menu would automatically re-activate the scanning operations of the mobile device 10. In order to account for the double click function, the processor 42 of the mobile device is programmed to wait for a predetermined period of time slightly longer then an amount of time given in which successive clicks are recognized as a double click, prior to processing a single click. In this manner, the processor 42 will not accidentally begin processing a single click command until sufficient time has passed to ensure that the first click is not the first of a successive double click request by the user. As the time requirement for initiating a double click will typically be very short (i.e. approximately one second) virtually no system delay is noticeable by a user.

Figure 8D:
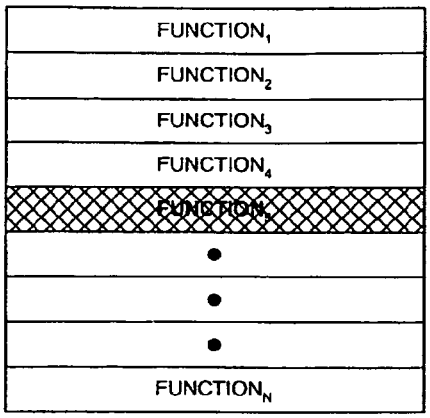
Figure 8E:
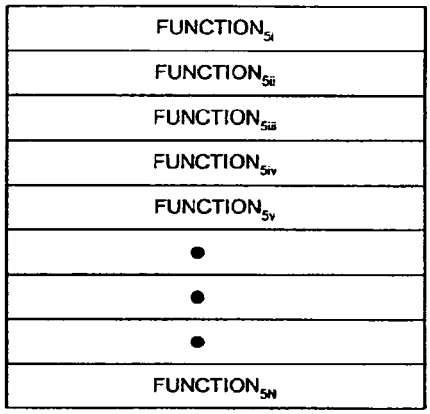

FIG. 8D shows the screen display 14 with $FUNCTION_5$ selected by the cursor. By the user depressing the thumb wheel 13 transaxially toward the mobile terminal 10, $FUNCTION_5$ is selected and the screen illustrated in FIG. 8E is displayed. This screen displays sub-functions $FUNCTION_{5i}$ through $FUNCTION_{5N}$ (wherein N is the number of functions). These functions are sub-functions of $FUNCTION_5$ shown on the previous screen in FIG. 8D. In the manner described above, the user can scroll through these sub-functions by rotating the wheel portion 13a of the thumb wheel 13 clockwise or counter clockwise. Once the user has positioned the cursor to a desired sub-function, he can then select that sub-function by deperessing the thumb wheel 13 in the manner described above.

The functions that are selectable from the screen are functions that are executable by the mobile terminal 10. Since the mobile terminal 10 is user programmable, executable functions can be added, deleted and/or modified. The executable functions can vary depending on the environment in which the mobile terminal 10 is being used. For instance, if the mobile terminal 10 is being used in a warehouse environment, some of the functions may include: (1) an inventory function; (2) a production lot size function; (3) reorder level function; (4) a safety stock function, etc. Sub-functions of the inventory function, for example, might include: (1i) a total relevant inventory cost function; (1ii) an ordering cost function; (1iii) a marginal cost function, etc.

If the mobile terminal 10 is being used in a medical environment, than upon scanning a patient's ID tag, the first screen display may include a patient name and his/her medical history chart. The next screen may display various features relating to that particular patient as sub functions. The sub functions might include, for example: (5i) the patient's age; (5ii) his or her sex; (5iii) present illness; (5iv) last blood pressure reading, (5v) last weight reading, etc.

As mentioned before, the scroll keys 20a and 20b along with the select key 20c can be used to accomplish the above scrolling and selection. However, using such keys would occupy both hands of a user (i.e., one to hold the terminal and one to press the respective keys). On the other hand, the thumb wheel 13 of the present invention would permit a user to hold the mobile terminal 10 in one hand and with the same hand accomplish the same scrolling and selecting via the thumb wheel 13.

Although the invention has been shown and described with respect to certain preferred embodiments, it is obvious that equivalents and modifications will occur to others skilled in the art upon the reading and understanding of the specification. For example, the present invention has been described with respect to a user visually identifying a desired function by way of the screen display 14 and the cursor. However, it will be appreciated that the present invention has utility with respect to a different tone being emitted as the cursor scrolls up or down the screen display. For instance, the tone may become higher in pitch as the cursor moves downward in response to clockwise rotation of the wheel portion 13a of the thumb wheel 13 by the user. As a result, a user familiar with the different tones and the corresponding function or item associated therewith could scroll through functions and select a desired function via the thumb wheel 13 and not even have to look at the screen while doing such.

Furthermore, it will be appreciated that quickly double clicking the thumb wheel 13 can also accomplish a predetermined task such as selecting a plurality of items such as the function identified by the cursor and a predetermined number of functions below the highlighted function.

Moreover, it will be appreciated that the thumb wheel 13 can also be used to change characteristics of the mobile terminal 10 such as the contrast or brightness of the screen display. For instance, a function (e.g., $FUNCTION_6$) could be user programmed which varies features of the screen display. Once a user selects this function, a new screen may be displayed which provide for changing particular screen characteristic such as, for example: (6i) screen brightness; (6ii) screen contrast; (6iii) color, (6iv) cursor brightness, etc.

Furthermore, since the mobile terminal 10 is user programmable, it will be appreciated that commercial programs or user programs could be loaded into the mobile terminal via a PCMCIA card into a PCMCIA card slot (not shown) of the mobile terminal or any other conventional means.

The present invention includes all such equivalents and modifications, and is limited only by the scope of the following claims.

What is claimed is:

[1. A hand held mobile device, the mobile device comprising:

a housing;

a user programmable processor within the housing;

a display operatively coupled to the processor, the display being controlled by the processor to display a plurality of functions relating to operation of the mobile device;

a thumb wheel extending from the housing, the thumb wheel including: a wheel portion rotatable about an axis, the wheel portion being selectably rotatable about the axis to facilitate a user selecting at least one function from the plurality of functions displayed on the display, the wheel portion being transaxially moveable and wherein transaxial movement of the wheel portion initiates selection of the at least one function; and a control circuit operatively coupled to the thumb wheel, wherein the control circuit provides at least one signal to the processor in response to movement of the wheel portion, the processor executing a predetermined routine corresponding to the at least one signal.]

[2. The mobile device of claim 1, wherein the thumb wheel further includes an encoding device for indicating movement of the wheel portion.]

[3. The mobile device of claim 1, wherein the processor can receive, store and execute programs input thereto by the user.]

[4. The mobile device of claim 1, wherein the wheel portion is rotatable in a clockwise direction to effect scrolling among the plurality of functions in a first direction and the wheel portion is rotatable in a counterclockwise direction to effect scrolling among the plurality of functions in a second direction.]

[5. The mobile device of claim 1, wherein the plurality of functions are split into groups, each group of functions being accessible by one of a plurality of menus selectable by the user via the thumb wheel.]

[6. The mobile device of claim 1, wherein the display displays a plurality of items stored by the mobile device.]

[7. The mobile device of claim 6, wherein the thumb wheel is selectively moveable to allow a user to select at least one item of the plurality of items stored by the mobile terminal.]

[8. The mobile device of claim 1, wherein the mobile device produces a tone, among a plurality of producible tones, corresponding to a particular movement of the wheel portion.]

[9. The mobile device of claim 8, wherein the tone varies in pitch according to the corresponding particular movement of the wheel portion.]

[10. The mobile device of claim 1, wherein a user can change the contrast of a screen display of the mobile device via the thumb wheel.]

[11. A method of selecting among a plurality of functions executable by a user programmable mobile terminal, comprising the steps of:

using an interrupt generator to monitor a thumb wheel for movement of a wheel portion of the thumb wheel;

using the interrupt generator to generate an interrupt request upon movement of the wheel portion, and sending the interrupt request to an interrupt handler;

using the interrupt handler to inform a processor that an interrupt relating to movement of the wheel portion has occurred;

using the processor to determine what type of wheel portion movement has occurred, wherein the processor relates a particular wheel portion movement to at least one of the plurality of functions executable by the programmable mobile terminal; and using the processor to perform a routine corresponding to the at least one of the plurality of functions executable by the programmable mobile terminal.]

[12. The method of claim 11, wherein the wheel portion is rotatable about an axis.]

[13. The method of claim 11, wherein the wheel portion is transaxially moveable.]

[14. The method of claim 11 wherein the processor can receive, store and execute programs input thereto by the user.]

[15. A mobile device, comprising:

a housing;

a user programmable processor within the housing, wherein the processor can receive, store and execute programs input thereto by the user;

a display coupled to the housing for displaying a plurality of programs executable by the mobile device; and a thumb wheel received within the housing, the thumb wheel being employable to select at least one function among the plurality of functions displayed on the display, the thumb wheel including a wheel portion, an encoding device and a control circuit, wherein: the wheel portion is rotatable about an axis and transaxially moveable, wherein transaxial movement of the wheel portion initiates selection of the at least one function;

the encoding device produces at least one signal indicative of movement of the wheel portion; and the control circuit is coupled to the encoding device for receiving the at least one signal from the encoding device and outputting a signal to the processor in response thereto, wherein the processor performs a particular routine among a plurality of routines executable by the processor in response to the signal output by the control device.]

[16. A hand held mobile device, the mobile device comprising:

a portable housing;

a user programmable processor within the housing;

a display for displaying a plurality of functions executable by the mobile device;

a thumb wheel extending from the housing, the thumb wheel facilitating selection of at least one function of the plurality of functions displayed on the display, the thumb wheel including:

a wheel portion rotatable around an axis and transaxially moveable, wherein transaxial movement of the wheel portion initiates selection of the at least one function; and a control circuit operatively coupled to the thumb wheel, wherein the control circuit provides a particular signal to the processor in response to a particular movement of the wheel portion, the processor executing a predetermined routine corresponding to the particular signal.]

[17. The mobile device of claim 16, wherein the display screen displays at least one function executable by the mobile device.]

[18. The mobile device of claim 17, wherein the movement of the wheel portion of the thumb wheel causes a cursor highlighting a function on the display screen to move to another function.]

[19. The mobile device of claim 18, wherein transaxial movement of the wheel portion causes the processor to perform operations associated with the highlighted function.]

[20. The mobile device of claim 19, wherein at least two successive depressions of the wheel in a transaxial direction within a predetermined period of time causes the cursor to highlight a predetermined function.]

[21. The mobile device of claim 20, wherein the wheel portion is rotatable in a clockwise direction to effect scrolling among the plurality of functions in a first direction and the wheel portion is rotatable in a counterclockwise direction to effect scrolling among the plurality of functions in a second direction.]

[22. The mobile device of claim 18, wherein an audible tone is sounded each time the cursor highlighting a function on the display screen is caused to move by movement of the wheel portion.]

*23. A programmable mobile terminal comprising:*

*a housing;*

*a user programmable processor within the housing;*

*a display operatively coupled to the processor, the display being controlled by the processor to display a plurality of functions executable by the programmable mobile terminal;*

*a thumb wheel extending from the housing, the thumb wheel including: a wheel portion rotatable about an axis, the wheel portion being selectably rotatable about the axis to facilitate a user selecting at least one function from the plurality of functions displayed on the display, the wheel portion being transaxially moveable and wherein transaxial movement of the wheel portion initiates selection of the at least one function; and*

*a control circuit operatively coupled to the thumb wheel, wherein the control circuit provides at least one signal to the processor in response to movement of the wheel portion, the processor executing a predetermined routine corresponding to the at least one signal.*

*24. The terminal of claim 23, wherein the display further displays inventory information which is to be transmitted to or is received from a system backbone.*

*25. The terminal of claim 23, wherein the display further displays pricing detail information which is to be transmitted to or is received from a system backbone.*

*26. The terminal of claim 23 adapted and user programmed for operation in a medical environment.*

*27. The terminal of claim 26, wherein at least one of the functions relates to a patient's age, a patient's sex, a patient's present illness, a patient's last blood pressure reading and a patient's last weight reading.*

*28. The terminal of claim 23, further comprising a card slot adapted to receive a memory card.*

*29. The terminal of claim 28, wherein the memory card stores executable programs that are executable by the processor.*

*30. The terminal of claim 28, wherein the memory card is a PCMCIA card.*

*31. The terminal of claim 28, wherein the memory card stores information received from or intended to be transmitted to a base station.*

*32. The terminal of claim 28, wherein the memory card stores information received from or intended to be transmitted to a local computer.*

*33. The terminal of claim 23, further comprising a power supply for providing power to the terminal.*

*34. The terminal of claim 33, wherein the power supply is connectable to an external power source.*

*35. The terminal of claim 23, wherein the thumb wheel comprises detents circumferentially spaced along the perimeter of the wheel portion.*

*36. The terminal of claim 23, wherein a direction of rotation of the thumb wheel is determined by comparing a phase difference between a first signal and a second signal output from an encoder circuit.*

*37. The terminal of claim 23, wherein and transaxial movement of the wheel portion a second time within a predetermined period of time initiates selection of a predefined function.*

*38. The terminal of claim 37, wherein the predefined function is not displayed on the display.*

*39. The terminal of claim 23, wherein the user can add a function to the functions executable by the programmable mobile terminal.*

*40. The terminal of claim 23, wherein the user can delete at least one of the functions executable by the programmable mobile terminal.*

*41. The terminal of claim 23, wherein the user can modify at least one of the functions executable by the programmable mobile terminal.*

*42. The terminal of claim 23, wherein at least one of the functions executable by the programmable mobile terminal is user programmable.*

*43. The terminal of claim 42, the functions comprising at least one of an inventory function, a production lot size function, a reorder level function, a safety stock function, a total relevant inventory cost function, an order cost function and a marginal cost function.*

*44. The terminal of claim 23, wherein the thumb wheel can change a characteristic of the terminal.*

*45. The terminal of claim 44, the characteristic comprising at least one of screen brightness, screen contrast, screen color and cursor brightness.*

*46. A programmable mobile terminal comprising:*

*a housing;*

*a user programmable processor within the housing;*

*a touch sensitive display operatively coupled to the processor, the touch sensitive display being controlled by the processor to display a plurality of functions executable by the programmable mobile terminal and receive information from a user;*

*a thumb wheel extending from the housing, the thumb wheel including: a wheel portion rotatable about an axis, the wheel portion being selectably rotatable about*

*the axis to facilitate the user selecting at least one function from the plurality of functions displayed on the display, the wheel portion being transaxially moveable and wherein transaxial movement of the wheel portion initiates selection of the at least one function; and*

*a control circuit operatively coupled to the thumb wheel, wherein the control circuit provides at least one signal to the processor in response to movement of the wheel portion, the processor executing a predetermined routine corresponding to the at least one signal.*

*47. A hand held inventory control device comprising:*

*a housing;*

*a user programmable processor within the housing;*

*a display operatively coupled to the processor, the display being controlled by the processor to display a plurality of functions executable by the hand held inventory control device;*

*a thumb wheel extending from the housing, the thumb wheel including: a wheel portion rotatable about an axis, the wheel portion being selectably rotatable about the axis to facilitate a user selecting at least one function from the plurality of functions displayed on the display, the wheel portion being transaxially moveable and wherein transaxial movement of the wheel portion initiates selection of the at least one function; and*

*a control circuit operatively coupled to the thumb wheel, wherein the control circuit provides at least one signal to the processor in response to movement of the wheel portion, the processor executing a predetermined routine corresponding to the at least one signal,*

*wherein the hand held inventory control device communicates via at least one of a narrow band and a radio communication system including multiple mobile terminals and base stations.*

*48. A programmable mobile terminal comprising:*

*a housing;*

*a user programmable processor within the housing;*

*a display operatively coupled to the processor, the display being controlled by the processor to display a plurality of functions executable by the programmable mobile terminal;*

*a thumb wheel extending from the housing, the thumb wheel including: a wheel portion rotatable about an axis, the wheel portion being selectably rotatable about the axis to facilitate a user selecting at least one function from the plurality of functions displayed on the display, the wheel portion being transaxially moveable and wherein transaxial movement of the wheel portion initiates selection of the at least one function; and,*

*a keypad having up and down cursor keys and a select key to additionally facilitate the user selecting at least one function from the plurality of functions displayed on the display, wherein movement of the select key initiates selection of the at least one function.*

* * * * *

UNITED STATES PATENT AND TRADEMARK OFFICE

CERTIFICATE OF CORRECTION

PATENT NO. : RE43,344 E
APPLICATION NO. : 10/968820
DATED : May 1, 2012
INVENTOR(S) : Cisar It is certified that error appears in the above-identified patent and that said Letters Patent is hereby corrected as shown below:

In the Specification:

Column 2, Line 26, delete "thumb" and insert -- a thumb --, therefor.

Column 2, Line 39, delete "handler," and insert -- handler; --, therefor.

Column 2, Line 53, delete "scanner," and insert -- scanner; --, therefor.

Column 5, Line 9, delete "23" and insert -- 28 --, therefor.

Column 5, Line 59, delete ""THAN"" and insert -- "TRAN" --, therefor.

Column 7, Line 27, delete "$switch_b$ 94" and insert -- $switch_B$ 94 --, therefor.

Column 7, Line 54, delete "$t_o$" and insert -- $t_0$, --, therefor.

Column 7, Lines 61-62, delete "switchB" and insert -- $switch_B$ --, therefor.

Column 8, Line 1, delete "switch," and insert -- $switch_A$ --, therefor.

Column 8, Line 39, delete "tie" and insert -- the --, therefor.

Column 8, Line 45, delete "teen" and insert -- been --, therefor.

Column 8, Line 50, delete "wheel" and insert -- wheel 13 --, therefor.

Column 9, Line 20, delete "FUNCTION," and insert -- $FUNCTION_1$ --, therefor.

Column 9, Line 24, delete "clockwise" and insert -- clockwise a --, therefor.

Column 10, Line 43, delete "reading," and insert -- reading; --, therefor.

Column 11, Line 17, delete "color," and insert -- color; --, therefor.

Signed and Sealed this
Eleventh Day of March, 2014

Michelle K. Lee

Michelle K. Lee
*Deputy Director of the United States Patent and Trademark Office*

In the Claims:

Column 13, Line 15, in Claim 17, before “displays”, delete “screen”.